United States Patent [19]
Weigl

[11] 3,858,615
[45] Jan. 7, 1975

[54] FLEXIBLE HOSE CONSTRUCTION
[75] Inventor: James Weigl, Santa Monica, Calif.
[73] Assignee: Puritan-Bennett Corporation, Kansas City, Mo.
[22] Filed: Dec. 11, 1972
[21] Appl. No.: 313,982

[52] U.S. Cl. ............................................. 138/121
[51] Int. Cl. ......................................... F16l 11/06
[58] Field of Search.................... 138/121, 122, 177

[56]         References Cited
        UNITED STATES PATENTS
3,122,171   2/1964   Britton et al.................... 138/122 X
    FOREIGN PATENTS OR APPLICATIONS
  395,559   3/1909   France............................... 138/122
1,038,443   9/1953   France............................... 138/122

Primary Examiner—Jerry W. Myracle
Attorney, Agent, or Firm—Fulwider, Patton, Rieber, Lee & Utecht

[57]         ABSTRACT

A kink-resistant hose construction which is particularly suited for use with respiration apparatus for infants comprises a one-piece tube of flexible material having a smooth, generally cylindrical inner wall surface for efficient air flow and easy cleaning and axially spaced concentric rings on its outer wall. The tube wall is very thin and flexible and is reinforced by the rings of the same material integrally formed on the outer wall of the tube. The rings are configurated and sized to substantially maintain their circular shapes even in sharp bends, and the unsupported portions of the tube wall or columns between rings allow bending with minimum effort. The axial spacing between rings is less than the inside diameter of the tube. Consequently, when the tube is bent sharply enough to buckle the unsupported portion, two adjacent rings contact each other and the folded portion of the thin wall extends only a small distance into the flow path so ample flow may be maintained.

14 Claims, 5 Drawing Figures

PATENTED JAN 7 1975 3,858,615

FLEXIBLE HOSE CONSTRUCTION

BACKGROUND OF THE INVENTION

This invention resides in the field of flexible hose construction and is directed particularly to a hose construction for use with infant respirators, which has minimum weight with maximum flexibility so as not to restrain the infant's movements while providing the essential property of preventing substantial or total blockage of air flow even under severe bending conditions.

In the treatment of infants with breathing problems, it is common to use automatic respiration apparatus which will supply the infant with air or oxygen at suitable pressure. The apparatus typically has controls for pressure, rate of flow, quantity of flow per cycle, and cycle rate.

In such a system, various conduits and conductors lead to a header with a tube for insertion through the infant's nostril or mouth to a predetermined extent for properly carrying out the mechanical respiration procedure. The hoses should be as light as possible to minimize the load on the child and should also be as flexible as possible to minimize resistance to movements of the child's head. Since life is dependent on the proper supplying and exiting of gas, it is essential that the flexibility of the hoses does not lead to any substantial blockage of flow even under conditions of severe bending.

The most common type of hose for this general purpose consists of rubber or plastic tubing having a wall of uniform thickness. In order to prevent kinking which would cause excessive or complete restriction of the flow passage, the wall must be quite thick relative to the inside diameter or the material must be quite firm, or both. The result is a hose or tube which is much heavier and much less flexible than is desirable for the purpose.

Another type of hose which has been considered and used to some extent is the "accordian" type in which the tube wall is formed with a spiral corrugation or a series of individual corrugations. This type is subject to the significant disadvantage that it is difficult to clean. The corrugations result in interruptions or pockets in the inside wall of the tube and, hence, in the flow path. Also, making an accordian type hose with sufficient flexibility that it is suitable for use in ventilating infants is extremely difficult.

Built-up or laminated hoses of differing materials are suitable for heavy duty and high-pressure work but are very heavy and stiff and are unsuitable for the present purpose.

SUMMARY OF THE INVENTION

The present invention overcomes the difficulties mentioned above and provides a hose construction of minimum weight and, at the same time, of maximum flexibility yet which prevents any kinking that would excessively restrict the flow path even under severe bending conditions.

Generally stated, the novel hose construction comprises a basic tube of flexible material having a very thin wall relative to the inside diameter of the tube, and a series of axially spaced reinforcing rings of the same material integrally formed on the outer surface of the tube wall. The inner surface of the tube wall is smooth and substantially cylindrical for maximum air flow and easy cleaning.

The unsupported portion of the tube wall or column between successive reinforcing rings flexes very readily and permits an unusually small radius of bend under its own weight without kinking. When a severe bending force is applied, the wall portion between rings buckles or folds inwardly toward the axis of the tube. Undesirable flow restriction is prevented by virtue of such buckling taking place while the rings remain substantially circular and by virtue of the dimensional relation of the parts. The axial length of each unsupported wall portion is preferably approximately 50 to 75 percent of the inside diameter of the tube. Therefore, if the reinforcing rings substantially retain their circularity, a wall portion cannot fold inwardly more than about a quarter of the inside diameter, leaving an adequate flow area. If the support rings are spaced too far apart axially, the unsupported wall portion between them can fold far enough inward so as to produce unacceptable restrictions. On the other hand, if the rings are spaced too close together, they will increase the minimum bend radius and also add unnecessary weight. Making them too thick will have this same effect.

It has been determined that the reinforcing rings will remain substantially circular under extreme bending of the tube if they have radial and axial thicknesses which approximate one half of the inside diameter of the tube. Since the tube wall is very thin, the outside diameter of the rings in the illustrative embodiment is approximately twice the inside diameter of the tube. The basic tube wall thickness is only about five to nine percent of the inside diameter of the tube, so that the bending resistance involved is very low. Should the tube wall thickness be unduly large in relation to the tube diameter, the rings cannot function properly and the tube loses its circularity in a bend with resulting intolerable restriction of the flow path.

When the bend reaches an advanced stage in the hose of the invention, the unsupported wall portion at the inside of the bend buckles or folds inward and the adjacent reinforcing rings contact each other at the inside of the bend, thus limiting the inward radial extent of the fold and the extent of resulting restriction.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
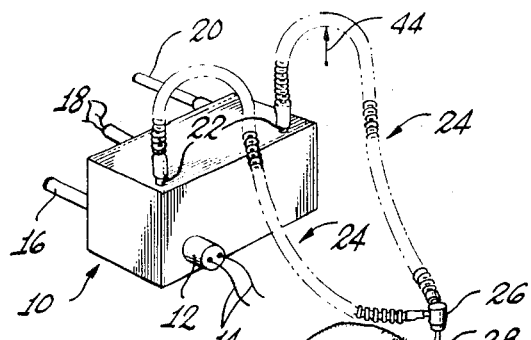
FIG. 1 is a schematic showing in perspective a transfer unit and a pair of hoses of the invention extending therefrom to a header.

The general environment in which the hose construction of the invention may be used with highly beneficial results is schematically illustrated in FIG. 1, in which a transfer unit 10 is provided with various conductors and conduits leading from the automatic respiration apparatus. Typical of such components are solenoid valve 12 and its conductors 14, air conduit 16 for air flowing from the respiration apparatus, expiration valve control conductors 18, and conduit 20 leading to a spirometer. Air flow ports 22 extend from the transfer unit, and hoses 24 are connected at their first ends to these ports and at their second ends to header 26. Terminal air flow tube 28 extends from the header into nostril 30 of the child 32 to a predetermined extent to properly supply air to the lungs and to withdraw it in a cycle regulated by the respiration apparatus.

Since the infant who is being treated is obviously very small and weak, it is apparent that the hoses 24 should be as light as possible to minimize the weight burden. They should also be as flexible as possible to minimize the resistance to movement of the infant's head. At the same time, it is essential that the tube or hose must not collapse or kink even under extreme bending conditions to such an extent that air flow will be restricted to an unacceptable degree. These characteristics are all attained by the construction of hose 24.

Figure 2:
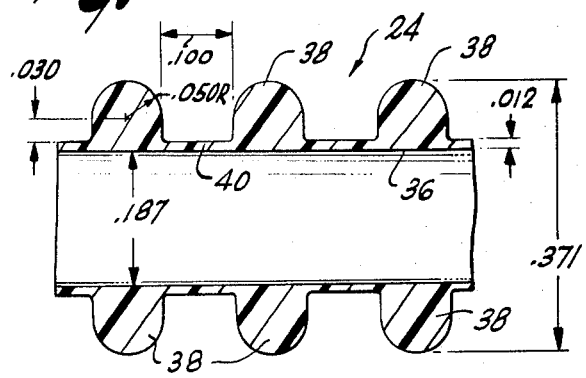
FIG. 2 is a longitudinal sectional view of a tube constructed in accordance with the invention.

The specific construction of the presently preferred form is shown in FIG. 2, in which hose 24 comprises a thin-walled basic tube 34 of resilient, flexible material, such as moldable plastic or rubber suitable for respiration use, having a smooth substantially cylindrical inner wall surface 36, and a series of external annular reinforcing rings 38 of the same material integrally formed on the outer wall of the tube. The rings 38 are concentric with the tube and are arranged in axially spaced relation along the major portion of its length.

The purpose of the rings 38 is to support the otherwise thin-walled tube so that an adequate flow path is maintained even though the hose is subjected to severe bending forces. The rings are sized and arranged whereby the unsupported tube portions or columns 40 buckle or collapse inwardly while the rings substantially retain their circular configuration. In addition, as may be seen in FIG. 4, adjacent rings 38 contact one another to limit the degree of bending of the hose in a given region.

The actual dimensions of a construction which has been determined to be particularly satisfactory for the purpose are indicated in FIG. 2. The relations between these dimensions are important to the success of the product. In this connection, the axial length of each unsupported tube portion of the tube wall 34 is approximately 50 percent of the inside diameter of the tube, and advantageous results may be achieved in the range of about fifty to 75 percent. The wall thickness of the tube 34 in the unsupported region is between 6 and 7 percent of the tube diameter and good results are achieved in the range of 5 to 9 percent. Still referring to FIG. 4, the outside diameter of the rings 38 is about twice the inside diameter of the tube. Thus, stated another way, the radial thickness of the rings 38 here is about 40 to 50 percent of the inside tube diameter and they serve their purpose advantageously in the range of thirty to sixty percent. The axial thickness of the rings adjacent to the tube wall preferably is about the same as or slightly greater than their radial thickness and approximates the length of the unsupported portions 40.

Figure 3:
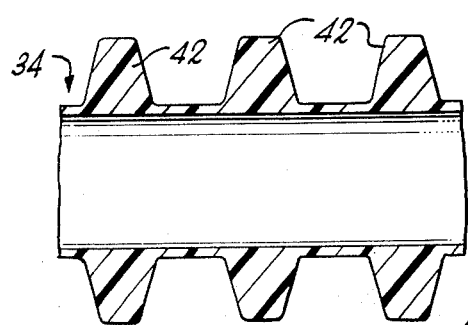
FIG. 3 is a similar view of a slightly modified form of construction.

The size of reinforcing rings 38 in relation to the inside diameter of the tube is sufficient that they substantially fully maintain their circular shape even under severe bending conditions. It is to be noted in this respect that the radial thickness or height of a ring has a greater bearing on its bend resistance than its axial width. An increase in resistance with approximately the same amount of material may be achieved with the variant of FIG. 3 in which the radial thickness of rings 42 is about 20 percent greater than that of rings 38 with about the same axial dimension at the base.

As will be noted in FIG. 1, the flexibility of a thin-walled tube of the basic wall thickness and diameter of hose 24, but without reinforcing rings, is such that it would bend about a radius 44 on the order of only seven or eight times the inside diameter of the tube under its own weight without kinking, so that full flow would be maintained at all times under normal conditions. Under more severe bending conditions, portions at the inside of the bend would kink or fold inward toward the axis of the tube and would be likely to unduly restrict flow. It is under this condition that the reinforcing rings 38 (FIGS. 4 and 5) come into play to prevent such a collapse as would produce excessive flow restriction.

Figure 4:
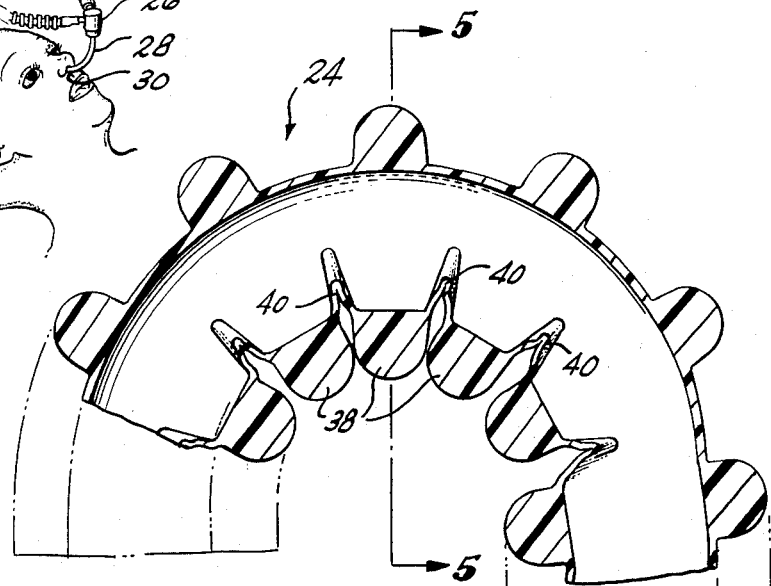
FIG. 4 is a schematic longitudinal sectional view of the tube in an extreme bend.

The function of the rings 38 is illustrated in FIG. 4, where it will be seen that as the bend becomes severe, one or more of the unsupported portions 40 folds inward toward the axis. Because the axial length of a portion 40 is only about one half of the inside diameter of the tube, the folded section can reach only about half way to the axis. The adjacent reinforcing rings 38 contact each other at the inside of the bend as shown and prevent any further movement, while some limited elongation occurs at the outside of the bend, as at 48. If the rings did not have enough stiffness they would deform to an oval shape, allowing the far side 48 of the tube to approach the folded portion 40 and greatly restrict the flow area. Since the dimensions of the rings relative to the tube and the arrangement of them are as outlined above, it will remain substantially circular.

Figure 5:
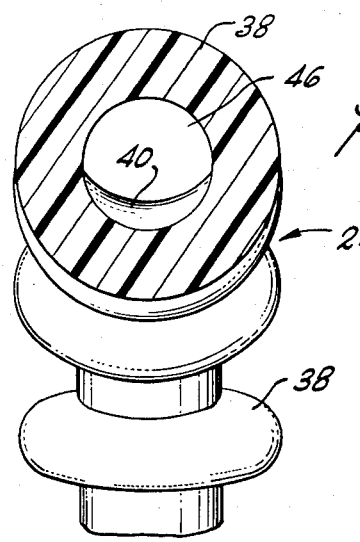
FIG. 5 is a sectional view taken on line 5—5 of FIG. 4.

The net resulting condition is shown in FIG. 5, where it will be seen that ring 38 remains substantially circular and the folded portion 40 extends only about half way to the axis of the tube, leaving a clear flow area 46 which is considerably more than one half of the flow area of the tube in its straight line condition shown in FIG. 2.

Once the force producing the bending is removed, the resilience or memory of the material causes the hose 24 to resume its original condition.

While various compounds are suitable for the material of the hose, it has been found that silicone rubber gives excellent results. Not only does it have good physical properties for a respiration application, but it readily adapts to be molded into the desired shape. Preferably, the material has a hardness of about 30 Shore, but in some cases may range up to about 60 Shore.

I claim:

1. A light, flexible hose construction resistant to blocking by bending, for use with respiration apparatus, comprising:

a thin-walled tube of resilient, flexible material having a smooth generally cylindrical inner wall surface;

and a plurality of external annular reinforcing rings of the same material integrally formed on the outer wall of the tube;

the rings being concentric with the tube and arranged in axially spaced relation along the major portion of the length of the tube;

the axial length of the unsupported portion of the tube wall between successive rings being from about 50 percent to about 75 percent of the diameter of said inner wall surface of the tube; and the radial thickness of the unsupported portion of the tube wall between successive reinforcing rings being from about 5 percent to about 9 percent of said diameter;

whereby the rings are spaced and sized to prevent substantial blocking of the tube due to bending, without impairing flexibility.

2. A hose construction as claimed in claim 1, wherein:

the radial thickness of each reinforcing ring outward of the tube wall is from about 30 percent to about 60 percent of the diameter of said inner wall surface of the tube.

3. A hose construction as claimed in claim 1, wherein:

the radial thickness of each reinforcing ring outward of the tube wall is approximately 50 percent of the diameter of said inner wall surface of the tube.

4. A hose construction as claimed in claim 1, wherein:

the axial thickness of each reinforcing ring is from about 30 percent to about 60 percent of the diameter of said inner wall surface of the tube.

5. A hose construction as claimed in claim 1, wherein:

the radial thickness of the unsupported portion of the tube wall between successive reinforcing rings being between 6 and 7 percent of the diameter of said inner wall surface of the tube.

6. A hose construction as claimed in claim 1, wherein:

the inside diameter of the tube is approximately 0.187 inch;

the wall thickness of the tube is in the range of 0.011 to 0.013 inch; and the radial thickness of said reinforcing rings is in the range of 0.050 to 0.100 inch.

7. A hose construction as claimed in claim 1, wherein:

the axial thickness of each of said reinforcing ring progressively decreases from its hose radially outward toward its extremity.

8. A base construction as claimed in claim 1, wherein:

the material of the tube is silicone rubber.

9. A flexible hose construction resistant to blocking by bending, and adapted for use with respiration apparatus, comprising:

a thin-walled basic tube composed of resilient flexible material and having a generally smooth inner wall surface which normally is of generally circular cross-section and has a preselected inside diameter; and a series of axially spaced and separated external reinforcing rings integrally formed of the same material on the outer side of said basic tube at preselected intervals along the tube and having a preselected outside diameter substantially greater than the outside diameter of said basic tube;

said basic tube and said reinforcing rings cooperating to form a series of thin-walled and unreinforced generally cylindrical portions of preselected length, substantially uniform thickness, relatively high flexibility, and relatively low resistance to collapse, joined together by reinforcing rings of substantially increased thickness, reduced flexibility, and relatively high resistance to collapse;

the outside diameter and axial spacing of said rings being selected to cause adjacent rings to abut against each other and resist further flexing of the intervening thin-walled portion before the intervening thin-walled portion can collapse sufficiently to cause substantial blocking of said hose construction, and the length of said thin-walled portions being correlated with said preselected inside diameter and said outside diameter of said reinforcing rings to prevent the application of collapsing forces to said reinforcing rings sufficient to substantially collapse the latter during any bending of said hose construction;

whereby said hose construction is virtually incapable of being collapsed during bending into any configuration, while at the same time being light in weight and low in resistance to bending.

10. A hose construction as defined in claim 9 wherein said length of said cylindrical portions is in the range of about 50 percent to about 75 percent of said inside diameter.

11. A hose construction as defined in claim 9 wherein the radial thickness of said rings is in the range of about 30 percent to about 60 percent of said inside diameter.

12. A hose construction as defined in claim 9 wherein the radial thickness of said reinforcing rings is approximately 50 percent of said inside diameter.

13. A hose construction as defined in claim 9 wherein the radial thickness of said reinforcing rings approximates the length of said cylindrical portions.

14. A hose construction as defined in claim 9 wherein:

the length of said unsupported cylindrical portions is less than said inside diameter, whereby inward buckling of one said cylindrical portions will block less than one-half of said hose construction, and is at least about fifty percent of said inside diameter;

the radial thickness of said rings is approximately fifty percent of said inside diameter; and the axial thickness of said rings is about the same as their radial thickness, and approximates the length of said unsupported portions.

* * * * *